W. Rankin,
Wood Molding Machine,

No. 29,992. Patented Sep. 11, 1860.

Witnesses:
E. Cohen
J. Hirsch

Inventor:
William Rankin
per atty A. B. Stoughton

UNITED STATES PATENT OFFICE.

WILLIAM RANKIN, OF RICHMOND, VIRGINIA.

MACHINE FOR PLANING MOLDINGS.

Specification of Letters Patent No. 29,992, dated September 11, 1860.

*To all whom it may concern:*

Be it known that I, WILLIAM RANKIN, of Richmond, in the county of Henrico and State of Virginia, have invented certain new and useful Improvements in Machines for Cutting Curved or Straight Moldings; and I do hereby declare the following to be a full, clear, and exact description of the same, reference being had to the accompanying drawings, making a part of this specification, in which—

Figure 2:
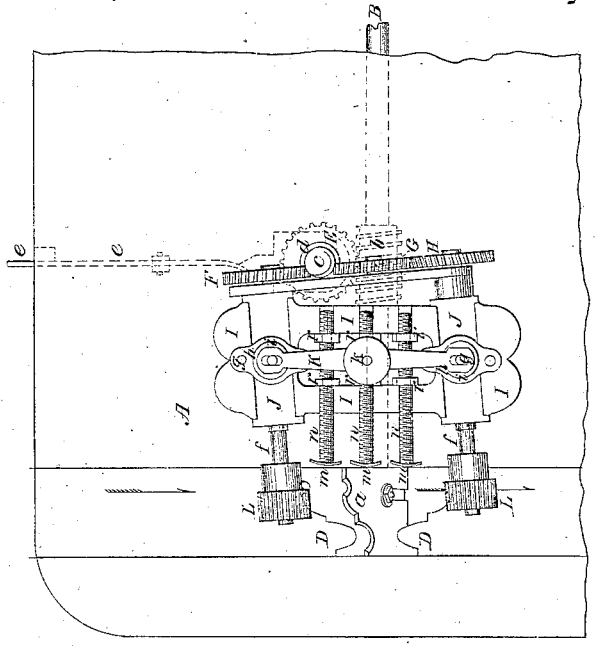
Figure 1:
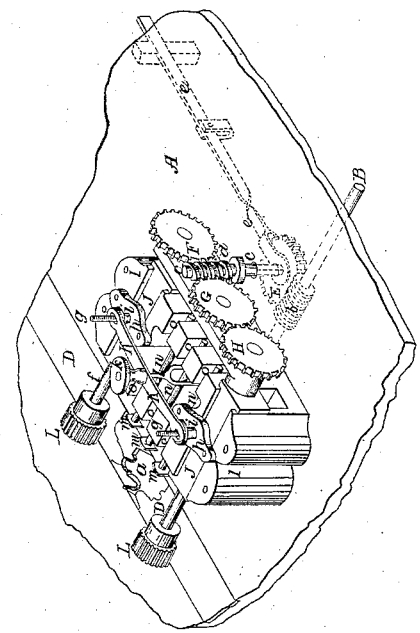
Figure 3:
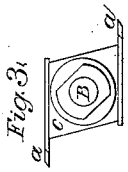

Figure 1 represents a perspective view of the top of the table, and the arrangement of the molding and feeding apparatus thereon. Fig. 2, represents a top plan of the same, and Fig. 3 represents an end view of the cutter head.

Similar letters of reference where they occur in the separate figures, denote like parts of the machine in all the drawings.

My invention consists, first, in making the margins of opening through the bed or table, through which the molding cutters project and work, of a form exactly the reverse of the cutting edges of the molding tool—the object being to prevent the wood from slivering—and, secondly, my invention consists in the combination of the oblique feed rolls, and adjustable guides, for directing the wood as it passes the cutters.

To enable others skilled in the art to make and use my invention, I will proceed to describe the same with reference to the drawings.

A, represents a table under which is hung in suitable bearings a shaft B, that is driven from any first moving power, and which carries at one of its ends a cutter head C, furnished with knives or cutters $a$, $a$, of the form of the molding desired to be cut, in reverse. These cutters project through the table or bed, and where they come through, I arrange a plate or plates D, D, whose edges next the openings are made the reverse of the cutting edges of the molding knives, and these plates may be so adjusted as to just allow the cutting edges to pass them, and this makes the chip so short, and cutting as it were against a solid bed there is no chance for the wood to sliver or rough up.

On the shaft B, there is a worm $b$, that turns a gear wheel E, on the lower end of a vertical shaft $c$ that projects up through the table, and has upon its upper portion a worm $d$, that gears with and turns the two cogged wheels F G—the one G, gearing with and turning a third cog wheel H. Underneath the table there is a shipper rod $e$, that straddles the gear wheel E, and by moving this shipper the gear E, is moved up into, or down out of, gear with the worm $b$—that part of the shaft $c$ on which the gear E moves being four or more sided so as always to turn with its shaft $c$.

On the table A, there is secured a pillow block I, in which are placed boxes J, J, for the shafts $f$ $f$, of the gears F, H, to turn in. To these boxes J, J, are secured screw rods $g$ $g$, that project upward, passing through straining plates $h$, $h$; and on top of these straining plates are nuts $i$, $i$, which run on the screw rods $g$, $g$.

K, is a spring made adjustable at its center by a nut $k$, running on a screw rod $l$— the ends of this spring resting on the thumb nuts $i$ $i$—so that the boxes J J with their shafts may not only admit of being raised or lowered to adapt their feeding rolls L L, to the thickness of the molding to be cut, but also to regulate the amount of spring pressure on them, to hold, and feed along, the stick or strip, on the bed or table. The rolls L may also be adjustable, so as to press upon any particular portion of the stick or strip.

$m$, $m$, $m$, are guides, of which there may be one, two, three, or more. They are arranged on screw rods $n$, $n$, $n$ which lie in slots $o$, $o$, $o$, in the pillow block I, and which by means of jam nuts $r$, $r$, $r$, may be adjusted toward or from the cutter head, so as to cut the molding on any desired part of the stick, which is fed along in contact with said guides. The stick is fed along past the cutters in the direction of the arrows Fig. 2, and it will be perceived that the feed rolls L L, and their shafts stand oblique to the line of feed, the object of this obliquity being to crowd the stick always against the guides $m$. By setting the guides in the arc of a circle a circular molding is cut—by setting them in line, a straight one is cut. By using the center one alone, the operator with a slight guiding motion of the hand, may cut a reversed curved molding, or one of any series of curves whether regular or irregular.

The plates D may be adjustable and removable, as they, as well as the cutters must be changed whenever the form of molding is to be changed. The stick is cut on its underside, the feed rolls holding it against the action of the cutters, and thus the chips never interfere with the operator, as they fall below the table.

A skilful operator may use the machine without the guides.

Having thus fully described the nature and object of my invention, what I claim, is—

The combination of the skewed feed rolls, and adjustable guides, for guiding or directing the stick in a straight or curved line, as it passes the cutters substantially as described.

WILLIAM RANKIN.

Witnesses:
A. B. STOUGHTON,
E. COHEN.